United States Patent
Wu et al.

(10) Patent No.: US 9,175,582 B1
(45) Date of Patent: Nov. 3, 2015

(54) VARIABLE VALVE LIFT DIAGNOSTIC TECHNIQUES BASED ON CAMSHAFT SPEED

(71) Applicants: Zhijian James Wu, Rochester Hills, MI (US); Steven J Gorgas, Ortonville, MI (US); Brian P Gebby, Macomb, MI (US); Ethan E Bayer, Lake Orion, MI (US); Kevin V Rafalo, Milford, MI (US); Julian D John, Oakland, MI (US); Jacob A Kohn, West Bloomfield, MI (US)

(72) Inventors: Zhijian James Wu, Rochester Hills, MI (US); Steven J Gorgas, Ortonville, MI (US); Brian P Gebby, Macomb, MI (US); Ethan E Bayer, Lake Orion, MI (US); Kevin V Rafalo, Milford, MI (US); Julian D John, Oakland, MI (US); Jacob A Kohn, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/338,873

(22) Filed: Jul. 23, 2014

(51) Int. Cl.
*F01L 1/34* (2006.01)
*G01M 15/04* (2006.01)
*F02D 41/04* (2006.01)

(52) U.S. Cl.
CPC . *F01L 1/34* (2013.01); *F02D 41/04* (2013.01); *G01M 15/042* (2013.01)

(58) Field of Classification Search
CPC .......... F01L 1/34; G01M 15/042; F02D 41/04
USPC ................................. 123/90.15, 90.16, 90.17
See application file for complete search history.

(56) References Cited

U.S. PATENT DOCUMENTS

| | | | |
|---|---|---|---|
| 7,024,304 B2 | 4/2006 | Fukasawa et al. | |
| 7,444,236 B2 | 10/2008 | Wiles | |
| 2001/0020458 A1* | 9/2001 | Mikame | 123/90.15 |
| 2011/0153181 A1 | 6/2011 | Bagnasco et al. | |
| 2012/0209494 A1 | 8/2012 | Verdejo et al. | |

* cited by examiner

Primary Examiner — Zelalem Eshete
(74) Attorney, Agent, or Firm — Ralph E. Smith

(57) ABSTRACT

An engine system and method for variable valve lift (VVL) diagnostic techniques are provided. In one exemplary implementation, the techniques include receiving, at a controller, a camshaft position signal indicative of detected edges of teeth of a camshaft toothed member that is coupled to a camshaft of an engine. The camshaft is configured to actuate a VVL system, which is configured to control a lift of a valve of the engine. The techniques also include calculating, at the controller, a camshaft speed signal indicative of a rotational speed of the camshaft based on the camshaft position signal. A valve stuck index (VSI) value is then calculated, at the controller, based on the camshaft speed signal. The techniques also include determining, at the controller, whether the valve is stuck based on a comparison of the VSI value to a predetermined threshold.

17 Claims, 4 Drawing Sheets

VARIABLE VALVE LIFT DIAGNOSTIC TECHNIQUES BASED ON CAMSHAFT SPEED

FIELD

The present disclosure relates generally to vehicle diagnostic systems and, more particularly, to variable valve lift (VVL) diagnostic techniques based on camshaft speed.

BACKGROUND

An internal combustion engine draws air into an intake manifold through an induction system that is regulated by a throttle. The air in the intake manifold is distributed to a plurality of cylinders via respective intake valves and combined with fuel to create an air/fuel mixture. The air/fuel mixture is compressed and combusted to rotatably turn a crankshaft and generate drive torque. Exhaust gas is expelled from the cylinders and into an exhaust system via respective exhaust valves. A variable valve lift (VVL) system is configured to adjust a maximum lift of the intake valves and/or the exhaust valves based on operating parameters of the engine. For example only, the VVL system could increase the valve lift at high engine loads and the VVL system could decrease valve lift at low engine loads. In some cases, a particular valve becomes stuck at a particular lift of the VVL system, thereby causing decreased performance, increased emissions and/or decreased fuel economy if not corrected.

SUMMARY

In one aspect, an engine system is provided in accordance with the teachings of the present disclosure. In an exemplary implementation, the engine system includes a camshaft configured to be rotatably driven to actuate a variable valve lift (VVL) system; a camshaft toothed member coupled to the camshaft and comprising teeth, each of the teeth having a pair of edges; a camshaft position sensor configured to detect the edges of the teeth of the toothed member and generate a camshaft position signal indicative of the detecting; and a controller configured to: generate a camshaft speed signal indicative of a rotational speed of the camshaft based on the camshaft position signal, calculate a valve stuck index (VSI) value based on the camshaft speed signal, and determine whether the valve is stuck based on a comparison of the determined VSI value to a predetermined threshold.

In another aspect, a method is provided in accordance with the teachings of the present disclosure. In an exemplary implementation, the method includes receiving, at a controller, a camshaft position signal indicative of detected edges of teeth of a camshaft toothed member that is coupled to a camshaft of an engine, the camshaft being configured to actuate a variable valve lift (VVL) system of the engine, the VVL system being configured to control a lift of a valve of the engine. The method includes generating, at the controller, a camshaft speed signal indicative of a rotational speed of the camshaft based on the camshaft position signal. The method includes calculating, at the controller, a valve stuck index (VSI) value based on the camshaft speed signal. The method also includes detecting, at the controller, whether the valve is stuck based on a comparison of the VSI value to a predetermined threshold.

In one exemplary aspect, calculating the VSI value based on the camshaft speed signal includes: filtering the camshaft speed signal to obtain a filtered camshaft speed signal, calculating an amplitude of the filtered camshaft speed signal to obtain an amplitude signal, subtracting a calibration value from the amplitude signal to obtain a modified amplitude signal, squaring the modified amplitude signal to obtain a squared amplitude signal, and selecting a maximum of the squared amplitude signal to obtain the VSI value.

In one exemplary aspect, the controller calculates edge-to-edge periods between consecutive detected edges of the teeth of the camshaft toothed member using the camshaft position signal. The controller interpolates each of the edge-to-edge periods based on a predetermined edge period to obtain interpolated edge-to-edge periods. The controller then calculates the rotational speed of the camshaft based on the interpolated edge-to-edge periods.

In one exemplary aspect, the valve is stuck when it is operating in a different lift mode than is being commanded by the VVL system. For example, the valve is stuck (i) when it is operating in a low lift mode when the VVL system is commanding a high lift mode or (ii) when it is operating in a high lift mode when the VVL system is commanding a low lift mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

A camshaft of an engine is configured to actuate a variable valve lift (VVL) system of the engine, which in turn is configured to control a lift of associated valves of the engine. Because the camshaft is in direct communication with the VVL system, fluctuations in camshaft speed or acceleration are potentially indicative of a stuck valve. The term "stuck valve" as used herein refers to a particular valve being stuck in a particular lift mode that is different than a lift mode currently being commanded by the VVL system. Accordingly, VVL diagnostic techniques based on camshaft speed are presented in accordance with the teachings of the present disclosure. While engines typically do not include camshaft speed sensors, engines typically do include camshaft position sensors. The VVL diagnostic techniques of the present disclosure utilize, in an exemplary implementation, a signal from the camshaft position sensor to calculate camshaft speed or acceleration.

By utilizing the existing camshaft position sensor, the techniques of the present disclosure are configured to be implemented without adding any additional sensor(s), thereby decreasing potential implementation costs and/or potential warranty costs. This camshaft position signal is also robust across all engine loads, and therefore is useable at both low engine loads (low valve lift) and high engine loads (high valve lift). More specifically, the techniques of the present disclosure detect, in one exemplary implementation, edge-to-edge periods corresponding to consecutive edges of teeth of a camshaft gear and/or toothed member or wheel coupled to the camshaft. These edge-to-edge periods are then interpolated and utilized to calculate the camshaft speed. The camshaft speed is used to calculate a valve stuck index (VSI) value, which is compared to a threshold to detect whether the valve is stuck.

Furthermore, these techniques are also implemented on-line, and thus the VVL diagnostics are capable of being performed in real-time or approximately in real-time in accordance with an aspect of the present disclosure. In other words, these VVL diagnostic techniques are very fast as opposed to conventional techniques that have large computational loads and large memory requirements. In one exemplary implementation, the stuck valve decision or determination could be made in approximately two engine cycles. In another exemplary implementation, the stuck valve decision or determination could be made during engine start. In yet other exemplary implementations, the VVL diagnostic techniques are also capable of distinguishing between different stuck valve scenarios (one valve stuck, two valves stuck, intake versus exhaust valve stuck, etc.), thereby providing for an even more accurate diagnostic.

Figure 1:
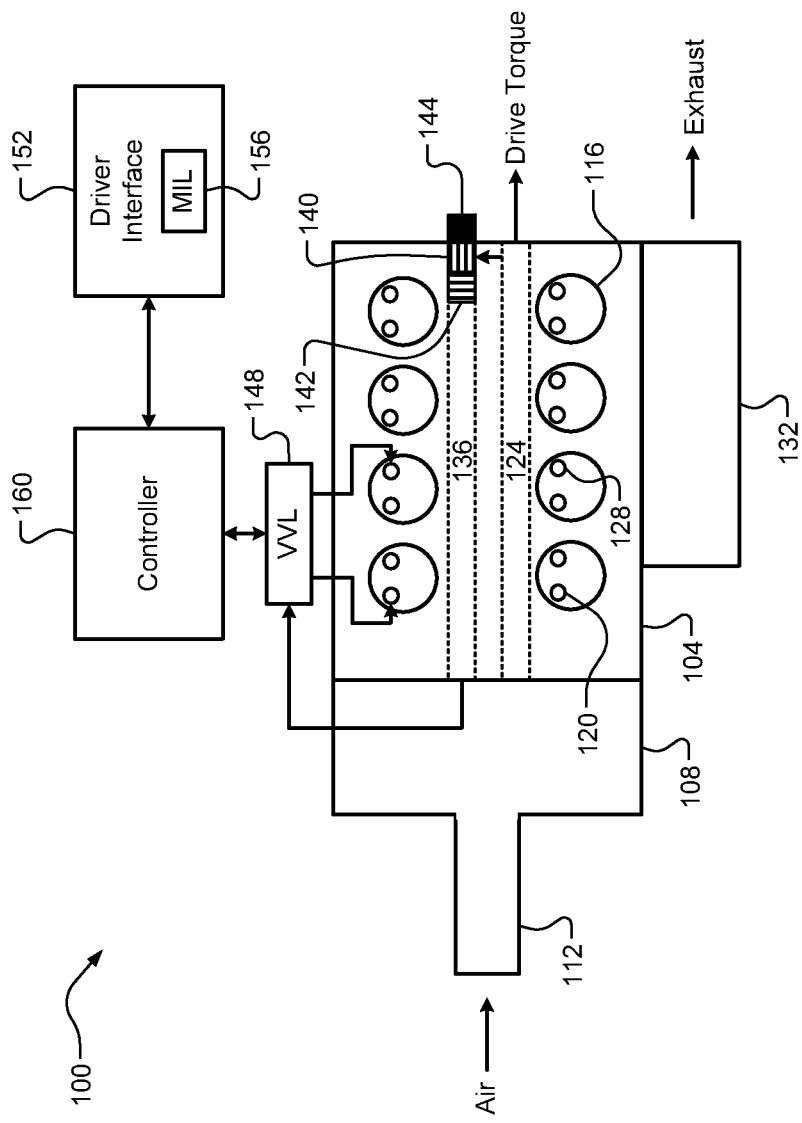
FIG. 1 is an example diagram of an engine system according to the principles of the present disclosure.

Referring now to FIG. 1, an example diagram of an engine system 100 is illustrated. The engine system 104 includes an internal combustion engine 104 (hereinafter "engine 104") configured to combust an air/fuel mixture to generate drive torque. Examples of the engine 104 include a spark ignition (SI) engine, a diesel engine, and a homogeneous charge compression ignition (HCCI) engine. While the engine 104 is shown to be a naturally-aspirated engine, it should be appreciated that the engine 104 could be configured for forced-induction (a supercharger, a turbocharger, etc.). The engine 104 draws air into an intake manifold 108 through an induction system 112. The air in the intake manifold 108 is distributed to a plurality of cylinders 116 (hereinafter "cylinders 120") via respective intake valves 120 and combined with fuel to create an air/fuel mixture.

The air/fuel mixture is compressed and combusted within the cylinders 116, e.g., using pistons (not shown), to rotatably turn a crankshaft 124 and generate drive torque. Exhaust gas resulting from combustion is expelled from the cylinders 116 via respective exhaust valves 128 and into an exhaust system 132. The exhaust system 132 treats the exhaust gas before releasing it into the atmosphere. The crankshaft 124 is configured to drive a camshaft 136 via a belt, chain, or other suitable device, as is known to those skilled in the art. Specifically, the crankshaft 124 is configured to drive a camshaft gear 140, such as with the belt or chain, that is coupled to the camshaft 136. While a single camshaft 136 is schematically shown (e.g., a single overhead camshaft), it will be appreciated that the engine 104 could include two camshafts 136 (e.g., dual overhead camshafts). In one exemplary implementation, the camshaft 136 could also include a toothed member or wheel 142 coupled to the camshaft 136 and/or the camshaft gear 140, as shown in FIG. 1 and will be discussed in greater detail below.

A camshaft position sensor 144 is configured to detect edges of teeth of the camshaft gear 140 or toothed member 142 for use in calculating a rotational position of the camshaft 136, which is described in greater detail below with reference to FIG. 2. The camshaft 136 is configured to actuate a VVL system 144, which in turn controls lift of the associated intake valves 120 and/or the exhaust valves 128. More particularly, the VVL system 148 is configured to adjust a maximum lift of the intake valves 120 and/or the exhaust valves 128, as is known to those skilled in the art. For example only, the VVL system 148 could increase the maximum valve lift at high engine loads and decrease the maximum valve lift at low engine loads. In one implementation, the VVL system 148 is a two-step valve system including a switchable roller finger follower and an oil control valve for each valve 120 and/or 128.

The engine system 100 also includes a driver interface 152, including an MIL 156, and a controller 160. The controller 160 controls operation of the engine 104. In particular, the controller 160 controls operation of the engine 104 in response to a torque request via the driver interface 152, e.g., an accelerator pedal, such that the engine 104 generates a desired drive torque. The MIL 156 is actuated to notify a driver that the engine 104 needs service. In the context of the present disclosure, the MIL 156 is associated with the VVL system 148 and is utilized to notify the driver that the VVL system 148 needs service, e.g., one or more of the intake valves 120 and the exhaust valves 128 are stuck at a particular valve lift. For example only, a particular valve 120 or 128 could be stuck in a low lift mode when high lift is being commanded, or vice-versa. It will be appreciated that while the discussion will continue with reference to a controller 160, the controller could include or more controllers and/or control modules in communication with each other, including through a controller area network.

Figure 2:
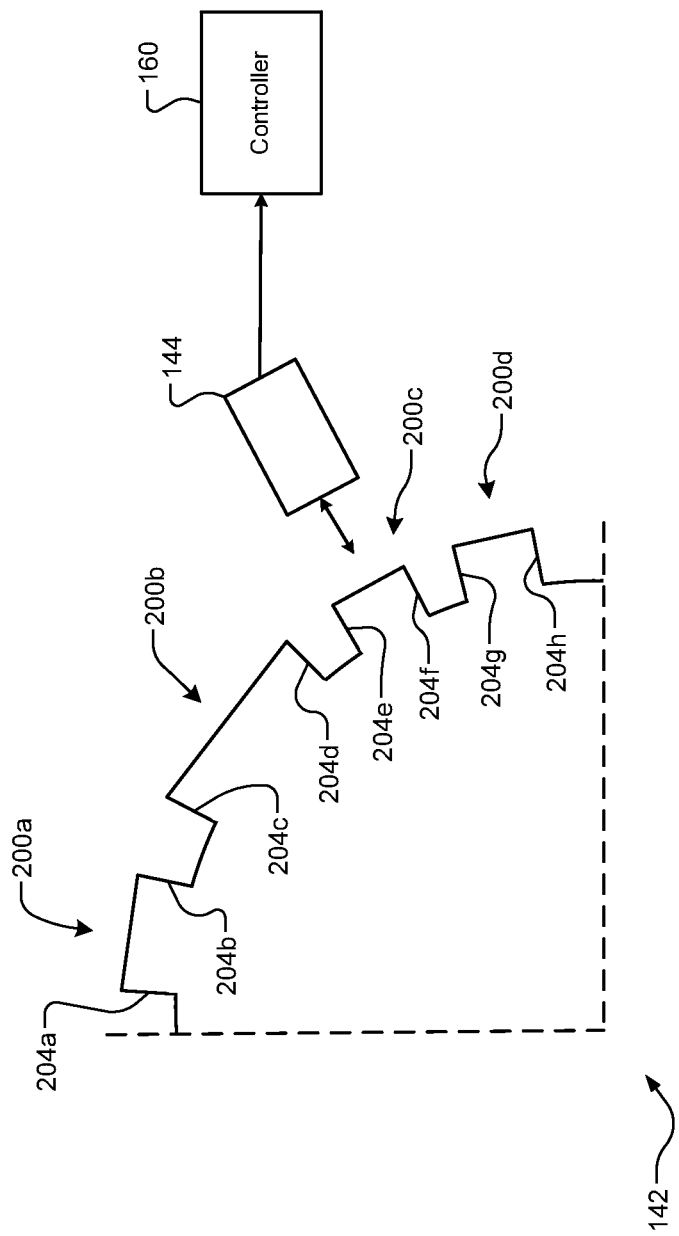
FIG. 2 is an example partial schematic diagram of a camshaft toothed member and a camshaft position sensor according to the principles of the present disclosure.

Referring now to FIG. 2, an example partial schematic diagram of the camshaft toothed member or wheel 142 and the camshaft position sensor 144 is shown and is now discussed. It will be appreciated that while the discussion will continue with reference to the camshaft position sensor 144 being associated with teeth of the toothed member 142, the camshaft position sensor 144 could alternatively be associated with the camshaft gear 140, where the camshaft gear 140 includes one or more missing teeth in one or more different combinations so as to provide detectable edges and/or patterns for the camshaft sensor 144. In other words, the exemplary camshaft gear 140 could be one example of the toothed wheel 142, where the above-referenced different combinations of missing teeth are utilized to provide the different spacing while also cooperating with the timing belt or chain.

As previously described, the camshaft gear 140 is coupled to the camshaft 136 and, therefore, the rotational speed of the camshaft gear 140 is proportional to the rotational speed of the camshaft 136 depending on the relative sizes of the coupling gears or members. The camshaft toothed wheel 142 is also fixed to the camshaft 136 and/or the camshaft gear 140 and includes a plurality of teeth 200. In the example illustrated, each tooth 200 includes a pair of edges 204. For simplicity, only a quarter of the camshaft toothed wheel 142 is illustrated. The camshaft toothed wheel 142 includes, in the exemplary implementation illustrated, four teeth 200a, 200b, 200c, and 200d. In this example, tooth 200a includes edges 204a and 204b, tooth 200b includes edges 204c and 204d, tooth 200c includes edges 204e and 204f, and tooth 200d includes edges 204g and 204h. It will be appreciated that the teeth 200 could also include or be in the form of other projections, such as splines, having the suitable pair of edges 204.

The camshaft position sensor 144 is configured to detect each of the edges 204. In one exemplary implementation, the camshaft position sensor 144 is a Hall effect sensor that outputs a varying voltage in response to a magnetic field. This varying voltage versus a phase or degree of rotation of the camshaft 136 represents a camshaft position signal. The width of and spacing between each of the teeth 200, however, varies. Therefore, in order to calculate the rotational speed of the camshaft 136, this variability must be accounted for. The controller 160 receives the camshaft position signal from the camshaft position sensor 144 and calculates edge-to-edge periods, as discussed in greater detail below. While calculation of the rotational speed of the camshaft 136 ("camshaft speed") is discussed herein, the techniques could alternatively generate a camshaft position signal indicative of the camshaft speed based on the camshaft position signal. This camshaft speed signal could then be processed to calculate the VSI value or signal, which is discussed in greater detail below.

Each edge-to-edge period represents a time between consecutive detected edges 204 of the teeth 200 of the camshaft toothed wheel 142. Due to the variable configuration, each of these edge-to-edge periods is interpolated or normalized with respect to a predetermined edge-to-edge period (e.g., 40 degrees). The controller 160 then calculates the acceleration or the rotational speed of the camshaft toothed wheel 142 using these interpolated edge-to-edge periods. Based on the determined rotational speed of the camshaft toothed wheel 142, the controller 160 calculates a VSI value, which is then used to detect whether or not a corresponding valve 120 or 128 is stuck. The calculated VSI value for a particular valve is, in one exemplary implementation, a value indicative of a likelihood that the particular valve is stuck. For example, fluctuations in camshaft speed above a predetermined threshold is, in one exemplary implementation, indicative of a stuck valve. An example calculation and use of the VSI value is now described in greater detail below.

In one exemplary implementation, the calculation of the VSI value further includes processing of the camshaft speed signal to remove noise and/or other unwanted components. An amplitude of the filtered camshaft speed signal is then calculated to obtain an amplitude signal. A calibration value is then subtracted from the calculated amplitude signal to obtain a modified amplitude signal. For example, the calibration could be derived from a lookup table that represents the acceleration amplitude of a nominal (i.e., non-stuck) case. The modified amplitude signal is then squared to obtain a squared amplitude signal. A maximum of the squared values of the squared amplitude signals of two cam systems is then selected as the VSI signal or value. This VSI signal or value is then compared to the threshold and detection of the stuck valve 120 or 128. Additionally, while calculation and utilization of camshaft speed is discussed herein, it will be appreciated that calculation and utilization of camshaft acceleration could be used instead. The camshaft acceleration represents change in the camshaft speed. The camshaft acceleration, therefore, could be similarly or more indicative of these fluctuations in the camshaft speed corresponding to stuck valves.

Figure 3A:
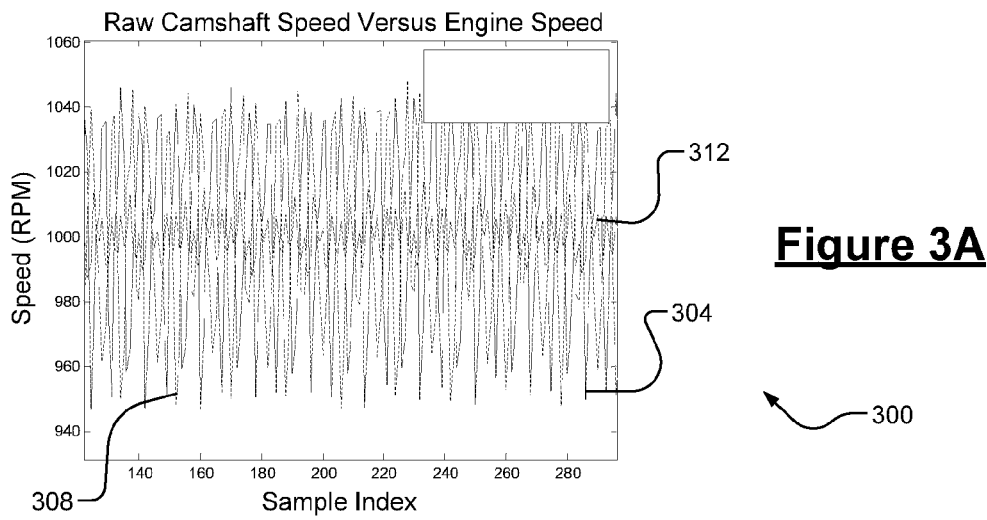
FIGS. 3A-3C are example graphs of camshaft speed and a valve stuck index (VSI) according to the principles of the present disclosure.
Figure 3B:
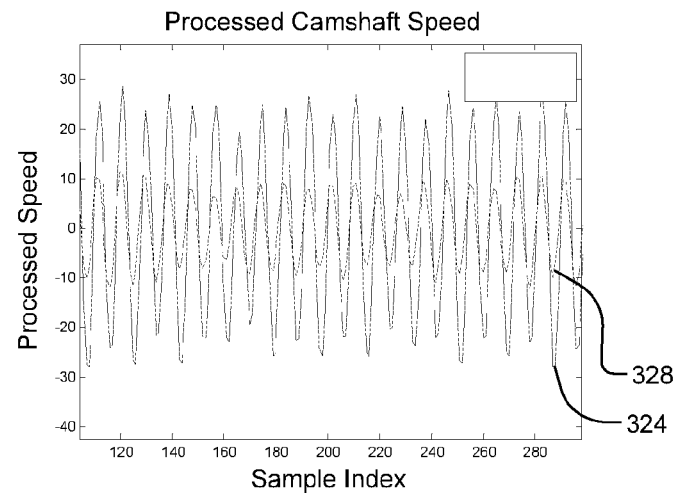
Figure 3C:
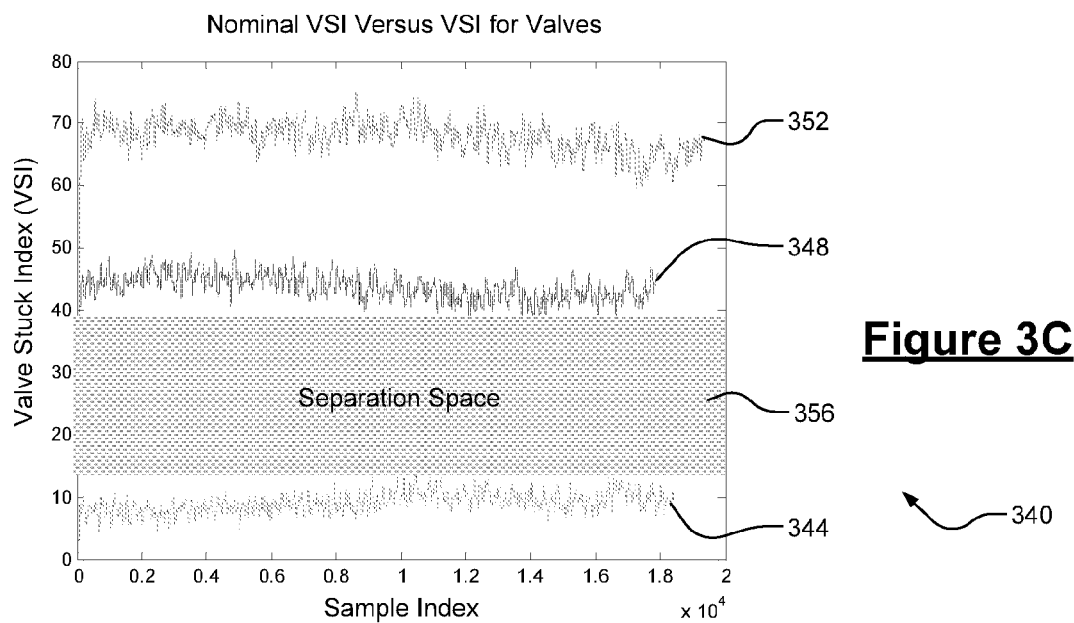

Referring now to FIGS. 3A-3C, example graphs of camshaft speed and VSI values are illustrated. FIG. 3A is a graph 300 illustrating raw camshaft speed signals and an engine speed signal in revolutions per minute (RPM). As illustrated, the camshaft speed signals have been multiplied by two for easier comparison with the engine speed signal. It will be appreciated, however, that the camshaft speed signals may not be scaled. The engine speed signal corresponds to a rotational speed of the crankshaft 124, which could be measured using a crankshaft position sensor (not shown). Specifically, a first camshaft speed signal 304 and a second camshaft speed signal 308 are shown with respect to engine speed 312. These signals 304, 308 are obtained on-line using the measurements from the camshaft position sensor 144 as described herein. For example, the first and second camshaft speeds 304, 308 could correspond to two camshafts (e.g., dual overhead camshafts) 136 of the engine 104. Alternatively, the first and second camshaft speed signals 304, 308 could correspond to the same camshaft 136 but captured at a different time and/or operating condition(s). As shown, the first and second camshaft speed signals 304, 308 are noisy and thus require filtering to remove noise and/or other unwanted signal components.

FIG. 3B is a graph 320 illustrating processed camshaft speed signals 324, 328. Examples of the processing include filtering and/or scaling the raw camshaft speed signals 304, 308. In one exemplary implementation, one or more digital filters, such as impulse response (IR) filters, are applied to the raw camshaft speed signals 304, 308 to obtain the processed camshaft speed signals 324, 328. It will be appreciated that other suitable digital filters could also be used. FIG. 3C is a graph 340 illustrating a nominal VSI signal 344 versus example or simulated VSI signals 348, 352 for two different stuck valves. As shown, the VSI signals 348, 352 for the two different stuck valves include VSI values that are much greater than the VSI values of the nominal VSI signal 344. As previously discussed, in one exemplary implementation the VSI value or signal is obtained by filtering/processing the camshaft speed signal, calculating its amplitude, subtracting the calibration, squaring, and then selecting a maximum. These operations create the large separation space 356 provides for a more accurate and robust stuck valve detection, as well as the potential ability to detect between different stuck valve scenarios (one valve stuck, two valves stuck, intake versus exhaust valves stuck, etc.).

Figure 4:
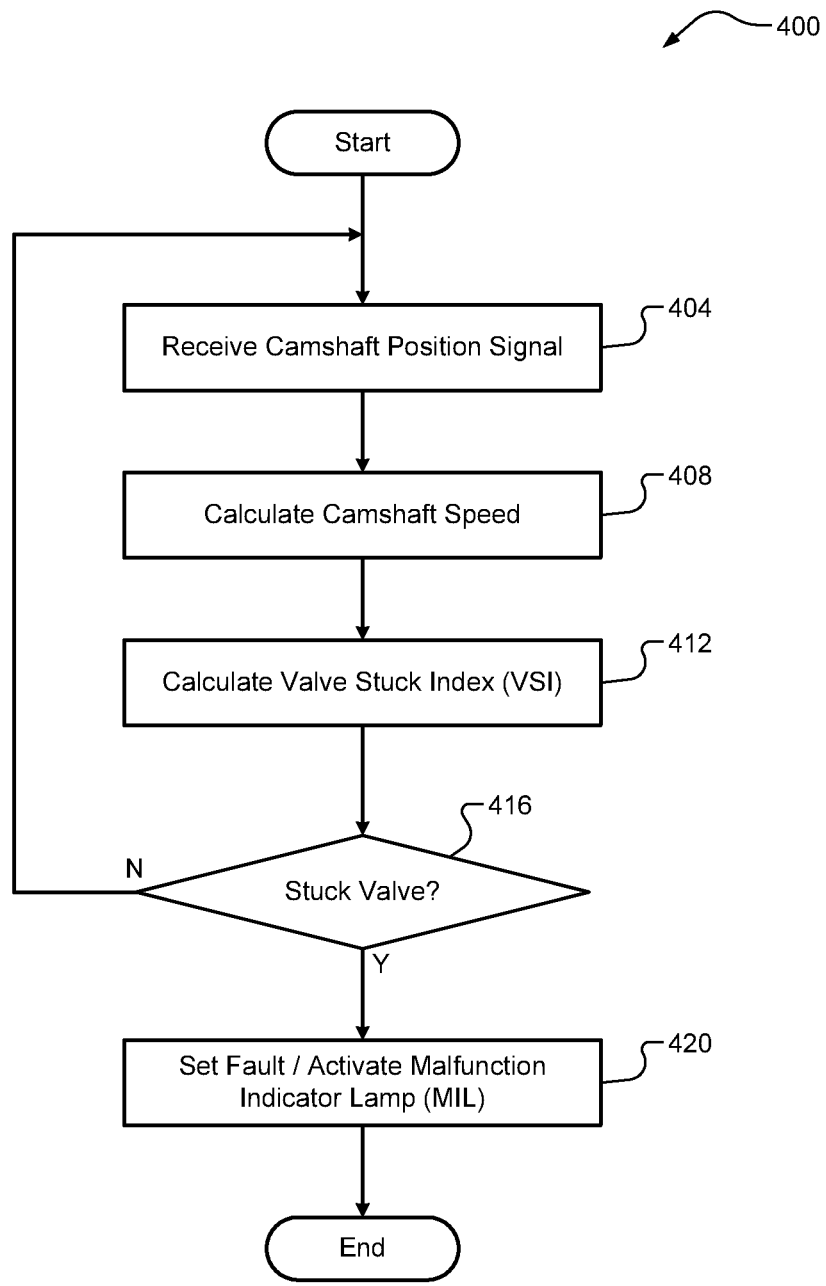
FIG. 4 is an example flow diagram of a method for variable valve lift (VVL) diagnostics based on camshaft speed according to the principles of the present disclosure.

Referring now to FIG. 4, an example method 400 for VVL diagnostics based on camshaft speed is illustrated. At 404, the controller 160 receives the camshaft position signal. In one exemplary implementation, the camshaft position signal is obtained using the camshaft position sensor 144 (e.g., a Hall effect sensor). At 408, the controller 160 calculates a rotational speed of the camshaft 136 ("camshaft speed") based on the camshaft position signal. In one exemplary implementation, the controller 160 determines edge-to-edge periods between teeth 200 of the camshaft toothed wheel 142 and interpolates the edge-to-edge periods with respect to a predetermined edge-to-edge period to obtain the camshaft speed.

At 412, the controller 160 calculates the VSI value for a specific valve 120 or 128. At 416, the controller 160 determines whether the specific valve 120 or 128 is stuck based on the VSI value. In one exemplary implementation, the controller 160 compares the VSI value to a predetermined stuck valve threshold to determine whether the specific valve 120 or 128 is stuck. If the specific valve 120 or 128 is determined to be stuck, the method 400 proceeds to 420. If the specific valve 120 or 128 is not determined to be stuck, the method 400 ends or returns to 404. At 420, the controller 160 sets a fault indicative of the stuck valve 120 or 128. In one exemplary implementation, the controller 160 activates the MIL 156. The technique 400 then ends or returns to 404 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An engine system, comprising:
a camshaft configured to be rotatably driven to actuate a variable valve lift (VVL) system configured to control a lift of a valve;
a camshaft toothed member coupled to the camshaft and comprising teeth, each of the teeth having a pair of edges;
a camshaft position sensor configured to detect the edges of the teeth and generate a camshaft position signal indicative of the detecting; and
a controller configured to:
generate a camshaft speed signal indicative of a rotational speed of the camshaft based on the camshaft position signal,
calculate a valve stuck index (VSI) value based on the camshaft speed signal, and
determine whether the valve is stuck based on a comparison of the determined VSI value to a predetermined threshold.

2. The engine system of claim 1, wherein the controller is further configured to calculate the VSI value based on the camshaft speed signal by
filtering the camshaft speed signal to obtain a filtered camshaft speed signal;
calculating an amplitude of the filtered camshaft speed signal to obtain an amplitude signal;
subtracting a calibration value from the amplitude signal to obtain a modified amplitude signal;
squaring the modified amplitude signal to obtain a squared amplitude signal; and
selecting a maximum of the squared amplitude signal to obtain the VSI value.

3. The engine system of claim 1, wherein the controller is further configured to calculate edge-to-edge periods between consecutive detected edges of the teeth of the camshaft toothed member using the camshaft position signal.

4. The engine system of claim 3, wherein the controller is further configured to interpolate each of the edge-to-edge periods based on a predetermined edge period to obtain interpolated edge-to-edge periods; and wherein the controller is configured to calculate the rotational speed of the camshaft based on the interpolated edge-to-edge periods.

5. The engine system of claim 1, wherein the valve is stuck when it is operating in a different lift mode than is being commanded by the VVL system.

6. The engine system of claim 5, wherein the valve is stuck (i) when it is operating in a low lift mode when the VVL system is commanding a high lift mode or (ii) when it is operating in a high lift mode when the VVL system is commanding a low lift mode.

7. The engine system of claim 1, wherein the controller is further configured to set a fault in response to detecting a stuck valve, and wherein setting the fault includes the controller activating a malfunction indicator lamp (MIL).

8. The engine system of claim 1, wherein the camshaft position sensor comprises a Hall effect sensor.

9. The engine system of claim 1, wherein the toothed member comprises a camshaft gear or a toothed wheel.

10. A method, comprising:
receiving, at a controller, a camshaft position signal indicative of detected edges of teeth of a camshaft toothed member that is coupled to a camshaft of an engine, the camshaft being configured to actuate a variable valve lift (VVL) system of the engine, the VVL system being configured to control a lift of a valve of the engine;
generating, at the controller, a camshaft speed signal indicative of a rotational speed of the camshaft based on the camshaft position signal;
calculating, at the controller, a valve stuck index (VSI) value based on the camshaft speed signal; and
detecting, at the controller, whether the valve is stuck based on a comparison of the VSI value to a predetermined threshold.

11. The method of claim 10, wherein calculating the VSI value based on the camshaft speed signal further includes:
filtering the camshaft speed signal to obtain a filtered camshaft speed signal;
calculating an amplitude of the filtered camshaft speed signal to obtain an amplitude signal;
subtracting a calibration value from the amplitude signal to obtain a modified amplitude signal;
squaring the modified amplitude signal to obtain a squared amplitude signal; and
selecting a maximum of the squared amplitude signal to obtain the VSI value.

12. The method of claim 10, further comprising:
calculating, at the controller, edge-to-edge periods between consecutive detected edges of the teeth of the camshaft toothed member using the camshaft position signal; and
interpolating, at the controller, each of the edge-to-edge periods based on a predetermined edge period to obtain interpolated edge-to-edge periods.

13. The method of claim 12, further comprising calculating, at the controller, the rotational speed of the camshaft based on the interpolated edge-to-edge periods.

14. The method of claim 10, further comprising setting, by the controller, a fault in response to detecting a stuck valve, and wherein setting the fault includes activating, by the controller, a malfunction indicator lamp (MIL).

15. The method of claim 10, wherein the camshaft position signal is obtained using a Hall effect sensor.

16. The method of claim 10, wherein the valve is stuck when it is operating in a different lift mode than is being commanded by the VVL system.

17. The method of claim 16, wherein the valve is stuck (i) when it is operating in a low lift mode when the VVL system is commanding a high lift mode, or (ii) when it is operating in a high lift mode when the VVL system is commanding a low lift mode.

* * * * *